US012236078B2

(12) United States Patent
Xia

(10) Patent No.: US 12,236,078 B2
(45) Date of Patent: Feb. 25, 2025

(54) INCORPORATING INTERACTION ACTIONS INTO VIDEO DISPLAY THROUGH PIXEL DISPLACEMENT

(71) Applicant: Tencent Technology (Shenzhen) Company Limited, Guangdong (CN)

(72) Inventor: Shuang Xia, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/963,879

(22) Filed: Oct. 11, 2022

(65) Prior Publication Data

US 2023/0036919 A1 Feb. 2, 2023

Related U.S. Application Data

(63) Continuation of application No. PCT/CN2021/117982, filed on Sep. 13, 2021.

(30) Foreign Application Priority Data

Oct. 10, 2020 (CN) .......................... 202011078356.9

(51) Int. Cl.
*G06F 3/04847* (2022.01)
(52) U.S. Cl.
CPC ................. *G06F 3/04847* (2013.01)
(58) Field of Classification Search
CPC ............. G06F 3/04847; G06F 3/04842; G06F 3/04845; G06F 3/0488; G06F 3/04883;
(Continued)

(56) References Cited

U.S. PATENT DOCUMENTS 10,956,724 B1 * 3/2021 Terrano ................. G06V 10/82
2001/0048753 A1   12/2001 Lee et al.
(Continued)

FOREIGN PATENT DOCUMENTS

| CN | 104394313 A | 3/2015 |
|----|-------------|--------|
| CN | 109242802 A | 1/2019 |

(Continued)

OTHER PUBLICATIONS

International Search Report and Written Opinion issued in International Application No. PCT/CN2021/117982, mailed Dec. 14, 2021, with English Translation, 10 pages.

(Continued)

*Primary Examiner* — Jennifer N Welch
*Assistant Examiner* — Amy P Hoang
(74) *Attorney, Agent, or Firm* — ArentFox Schiff LLP

(57) ABSTRACT

A video processing method includes obtaining, in response to an interaction operation received on a portion of a first image, an adjustment parameter corresponding to the interaction operation. The adjustment parameter indicates an adjustment range of a display position of one or more pixels corresponding to the portion of the first image based on the interaction operation. The method further includes obtaining a displacement parameter of the one or more pixels in the portion of the first image, the displacement parameter representing a displacement of the one or more pixels between the first image and a second image displayed after the first image. The method also includes adjusting a display position of one or more pixels in the second image based on the adjustment parameter and the displacement parameter, and displaying the second image based on the adjusted display position of the one or more pixels.

19 Claims, 4 Drawing Sheets

(58) Field of Classification Search
CPC ..... H04N 21/440245; H04N 21/47205; H04N 21/8106; H04N 21/8583; H04N 21/42204; H04N 21/431; H04N 21/439; H04N 21/47202; H04N 21/485
See application file for complete search history.

(56) References Cited

U.S. PATENT DOCUMENTS

| | | | | |
|---|---|---|---|---|
| 2006/0285724 | A1 | 12/2006 | Tian | |
| 2010/0261526 | A1* | 10/2010 | Anderson | G06F 3/016 345/157 |
| 2011/0250962 | A1* | 10/2011 | Feiner | A63F 13/57 463/31 |
| 2014/0083280 | A1* | 3/2014 | Little | G06F 3/017 84/609 |
| 2015/0138063 | A1* | 5/2015 | Cao | G06V 40/10 345/156 |
| 2016/0125235 | A1* | 5/2016 | Gu | G06T 7/215 382/103 |
| 2016/0267664 | A1* | 9/2016 | Davis | G06T 13/80 |
| 2019/0272094 | A1 | 9/2019 | Minsky | |
| 2023/0032334 | A1* | 2/2023 | Hane | B25J 9/161 |

FOREIGN PATENT DOCUMENTS

| | | |
|---|---|---|
| CN | 110324672 A | 10/2019 |
| CN | 111147880 A | 5/2020 |
| CN | 112218136 A | 1/2021 |
| EP | 3591953 A1 | 1/2020 |

OTHER PUBLICATIONS

Supplementary European Search Report issued in Application No. 21876929.7, mailed Sep. 18, 2023, 13 pages.

* cited by examiner

INCORPORATING INTERACTION ACTIONS INTO VIDEO DISPLAY THROUGH PIXEL DISPLACEMENT

RELATED APPLICATIONS

This application is a continuation of International Application No. PCT/CN2021/117982, filed on Sep. 13, 2021, which claims priority to Chinese Patent Application No. 202011078356.9, filed on Oct. 10, 2020. The entire disclosures of the prior applications are hereby incorporated by reference.

FIELD OF THE TECHNOLOGY

This application relates to the field of computer technologies, including a video processing method and apparatus, a computer device, and a storage medium.

BACKGROUND OF THE APPLICATION

Videos have enriched people's lives. People can obtain various information intuitively and efficiently by watching videos, and have access to a colorful world. Videos include images and audio, and can provide users with an intuitive and engaging viewing experience in both visual and auditory terms.

SUMMARY

Embodiments of this disclosure provide a video processing method and apparatus, a computer device, and a storage medium, which can support interaction between a user and a video being played, enhance the video interactivity, and improve the visual effect during a video playing process. In an embodiment, a video processing method includes obtaining, in response to an interaction operation received on a portion of a first image, an adjustment parameter corresponding to the interaction operation. The adjustment parameter indicates an adjustment range of a display position of one or more pixels corresponding to the portion of the first image based on the interaction operation. The first image is an image currently displayed in a video being played. The method further includes obtaining a displacement parameter of the one or more pixels in the portion of the first image, the displacement parameter representing a displacement of the one or more pixels between the first image and a second image displayed after the first image. The method also includes adjusting a display position of one or more pixels in the second image based on the adjustment parameter and the displacement parameter, and displaying the second image based on the adjusted display position of the one or more pixels.

In an embodiment, a video processing apparatus includes processing circuitry configured to obtain, in response to an interaction operation received on a portion of a first image, an adjustment parameter corresponding to the interaction operation. The adjustment parameter indicates an adjustment range of a display position of one or more pixels corresponding to the portion of the first image based on the interaction operation. The first image is an image currently displayed in a video being played. The processing circuitry is further configured to obtain a displacement parameter of the one or more pixels in the portion of the first image, the displacement parameter representing a displacement of the one or more pixels between the first image and a second image displayed after the first image. The processing circuitry is further configured to adjust a display position of one or more pixels in the second image based on the adjustment parameter and the displacement parameter, and display the second image based on the adjusted display position of the one or more pixels.

In an embodiment, a non-transitory computer-readable storage medium stores computer-readable instructions thereon, which, when executed by a processor, cause the processor to perform a video processing method. The video processing method includes obtaining, in response to an interaction operation received on a portion of a first image, an adjustment parameter corresponding to the interaction operation. The adjustment parameter indicates an adjustment range of a display position of one or more pixels corresponding to the portion of the first image based on the interaction operation. The first image is an image currently displayed in a video being played. The method further includes obtaining a displacement parameter of the one or more pixels in the portion of the first image, the displacement parameter representing a displacement of the one or more pixels between the first image and a second image displayed after the first image. The method also includes adjusting a display position of one or more pixels in the second image based on the adjustment parameter and the displacement parameter, and displaying the second image based on the adjusted display position of the one or more pixels.

In the technical solutions provided in the embodiments of this disclosure, a displacement parameter can represent a displacement of a pixel changing between a first image and a second image, and an interaction operation may be received on the first image of a video, so the interaction operation may affect the displacement of the changing pixel. A display position of a pixel of the first image is adjusted in combination with the displacement parameter and an adjustment parameter, so that an action effect of the interaction operation can be presented on the second image displayed after the first image. Thus, the video presents a dynamic effect with a higher degree of matching with the interaction operation, interaction between a user and the video being played is supported, the interactivity of the video is enhanced, and the visual effect during a video playing process is improved.

BRIEF DESCRIPTION OF THE DRAWINGS

To describe technical solutions in embodiments of this disclosure, the following briefly introduces accompanying drawings describing the embodiments. The accompanying drawings in the following description show merely some embodiments of this disclosure, and a person of ordinary skill in the art may still derive other accompanying drawings according to the accompanying drawings.

DESCRIPTION OF EMBODIMENTS

To explain objectives, technical solutions, and advantages of this disclosure, the following further describes implementations of this disclosure in detail with reference to the accompanying drawings.

In the specification, claims, and accompanying drawings of this disclosure, the terms "first", "second", "third", "fourth", and so on are intended to distinguish between different objects but do not indicate a particular order. In addition, the terms "include", "have", and any variant thereof are intended to cover a non-exclusive inclusion. For example, a process, method, system, product, or device that includes a series of steps or units is not limited to the listed steps or units; and instead, further may include a step or unit that is not listed, or further may include another step or unit that is intrinsic to the process, method, product, or device.

In the related art, videos are played on a screen of a computer device. During a video playing process, the computer device does not support a user to interact with the video being played. The video playing performance of the computer device cannot meet the interaction requirements, and the experience mode during the video playing process is relatively simple.

For ease of understanding, the terms involved in the embodiments of this disclosure are explained and described below.

Optical flow estimation includes an optical flow representing an instantaneous displacement of each pixel in an image, which is obtained based on a correlation of each pixel between frames in a video. For two frames of images I(t−1) and I(t) that are adjacent in a time sequence, after pixels on the I(t−1) are displaced, positions of the pixels are consistent with those on the I(t). In one aspect, a position of an object at the next moment can be known through the optical flow estimation, so that the speed and accuracy of the target tracking in a video can be improved by using an optical flow, and the effect of the fast object tracking can be implemented in a video playing process. In another aspect, a motion trend of a pixel in a current frame to the next frame can be predicted through the optical flow estimation.

In semantic segmentation, an image is understood at a pixel level, and pixels in the image are classified into a plurality of categories. For example, an image includes a motorcycle and a person riding a motorcycle, and through the semantic segmentation, pixels depicting the person riding a motorcycle are classified into the same category, and pixels depicting the motorcycle are classified into another category.

Figure 1:
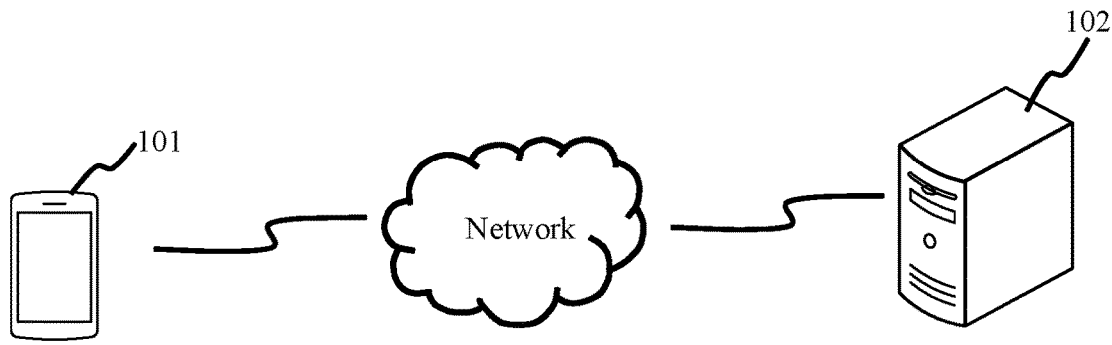
FIG. 1 is a schematic diagram of an implementation environment according to an embodiment of this disclosure.

FIG. 1 is a schematic diagram of an implementation environment according to an embodiment of this disclosure. Referring to FIG. 1, in an implementation, the implementation environment includes a terminal 101, and the video processing method provided in this embodiment of this disclosure is performed by the terminal 101. In an embodiment, the terminal 101 is a smartphone, a tablet computer, a notebook computer, a desktop computer, a smart TV, a virtual reality (VR) device, or the like, but is not limited thereto. In an embodiment, the terminal 101 is provided with an application that supports video interactive playing, for example, the application is a video playing application, a browser, or the like.

In another implementation, the implementation environment includes a terminal 101 and a server 102, and the video processing method provided in this embodiment of this disclosure is implemented through interaction between the terminal 101 and the server 102. The server 102 may be an independent physical server; or may be a server cluster including a plurality of physical servers or a distributed system; or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. In an embodiment, the server 102 and the terminal 101 are directly or indirectly connected in a wired or wireless communication manner, which is not limited in this disclosure.

In an embodiment, the technical solutions provided in the embodiments of this disclosure are implemented and executed by a terminal; or the technical solutions provided in the embodiments of this disclosure are implemented and executed by a server; or the technical solutions provided in the embodiments of this disclosure are implemented through the interaction between a terminal and a server, which is not limited in this disclosure. In this embodiment of this disclosure, an example in which the technical solutions are executed by a terminal is used for description.

Figure 2:
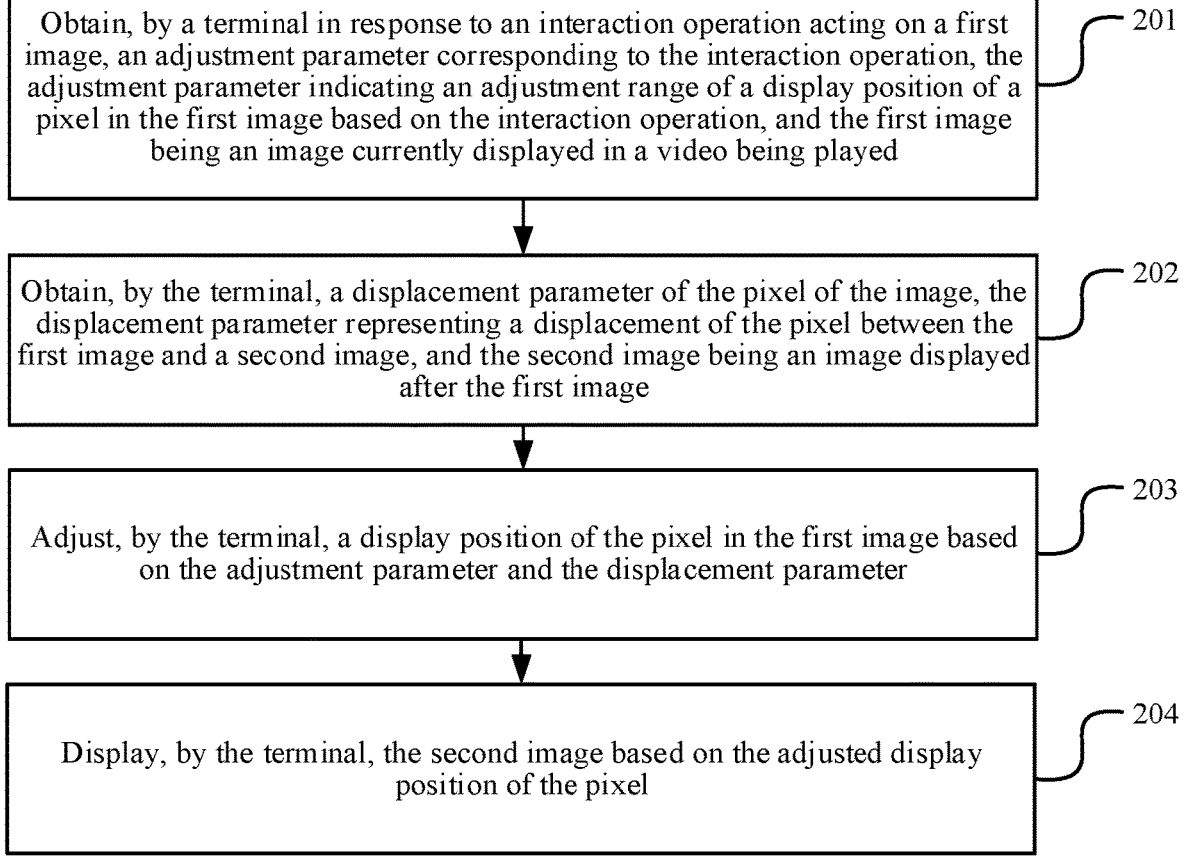
FIG. 2 is a flowchart of a video processing method according to an embodiment of this disclosure.

FIG. 2 is a flowchart of a video processing method according to an embodiment of this disclosure. Referring to FIG. 2, in this embodiment of this disclosure, an example in which the terminal is an execution entity is used for description.

In step 201, in response to an interaction operation received on a portion of a first image, an adjustment parameter is obtained by a terminal, the adjustment parameter corresponding to the interaction operation, the adjustment parameter indicating an adjustment range of a display position of one or more pixels corresponding to the portion of the first image based on the interaction operation, and the first image being an image currently displayed in a video being played.

A video includes a plurality of frames of static images, and the plurality of frames of images are rapidly and successively displayed on a terminal according to a first frame rate, to implement a dynamic video effect. The first frame rate is any frame rate.

The terminal obtains an adjustment parameter corresponding to an interaction operation, adjusts a display position of a pixel in a first image based on the adjustment parameter, and presents an action effect of the interaction operation in the next frame of image, that is, in a second image displayed after the first image.

In a case that the terminal is a smartphone, a tablet computer, a notebook computer, a desktop computer, a smart TV or another device, a user triggers an interaction operation on a first image through touching a display screen of the terminal, or triggers the interaction operation on the first image through performing an operation on the display screen through a mouse or a keyboard. During a process of displaying the first image in the video, the terminal detects an interaction operation acting on the first image, and obtains the adjustment parameter corresponding to the interaction operation.

In a case that the terminal is a VR device, the user wears a hand operation sensing apparatus in the VR device, and interacts with the video through the hand operation sensing apparatus. During a process of displaying a frame of image in the video, the VR device detects an interaction operation through the hand operation sensing apparatus, and obtains the adjustment parameter corresponding to the interaction operation.

In step 202, a displacement parameter of the one or more pixels in the portion of the first image is obtained by the terminal, the displacement parameter representing a displacement of the one or more pixels between the first image and a second image displayed after the first image.

There is a correlation of a pixel of two adjacent frames of images in a video, and the displacement of the pixel between frames is visually represented as the motion of an object in a video screen. The motion of the same pixel from an $N^{th}$ frame image to an $N+1^{th}$ frame image is expressed as an optical flow, N is a positive integer, the $N^{th}$ frame image may be referred to as the first image, and the N+1th frame image may be referred to as the second image. The instantaneous displacement of a pixel between original two adjacent frames in a video is represented by an optical flow estimation parameter, that is, the instantaneous displacement of the pixel between the original two adjacent frames in the video is represented by the displacement parameter.

In step 203, a display position of one or more pixels in the second image is adjusted by the terminal based on the adjustment parameter and the displacement parameter.

The displacement parameter represents the original displacement of a pixel between one frame image and the next frame image, that is, the displacement parameter represents the displacement of the pixel between the first image and the second image. Based on the displacement parameter, a position of the pixel is offset, and the change of the original displacement of the pixel can be displayed. Then, in combination with an adjustment parameter, the position of the pixel is offset again, and the change of the displacement caused by the interaction operation can be superimposed on the basis of the change of the original displacement of the pixel, so as to implement the adjustment of the display position of the pixel.

In step 204, a second image is displayed by the terminal based on the adjusted display position of the one or more pixels.

The second image displayed based on the adjusted display position of the pixel can present the action effect of the interaction operation, thereby implementing the video interactive playing.

In the technical solutions provided in the embodiments of this disclosure, because a displacement parameter can represent a displacement of a pixel changing between a first image and a second image, and in a case that an interaction operation acts on the first image of a video, the interaction operation may affect the displacement of the changing pixel, a display position of a pixel of the first image is adjusted in combination with the displacement parameter and an adjustment parameter, so that an action effect of the interaction operation can be presented on the second image displayed after the first image. Thus, the video presents a dynamic effect with a higher degree of matching with the interaction operation, interaction between a user and the video being played is supported, the interactivity of the video is enhanced, and the visual effect during a video playing process is improved.

Figure 3:
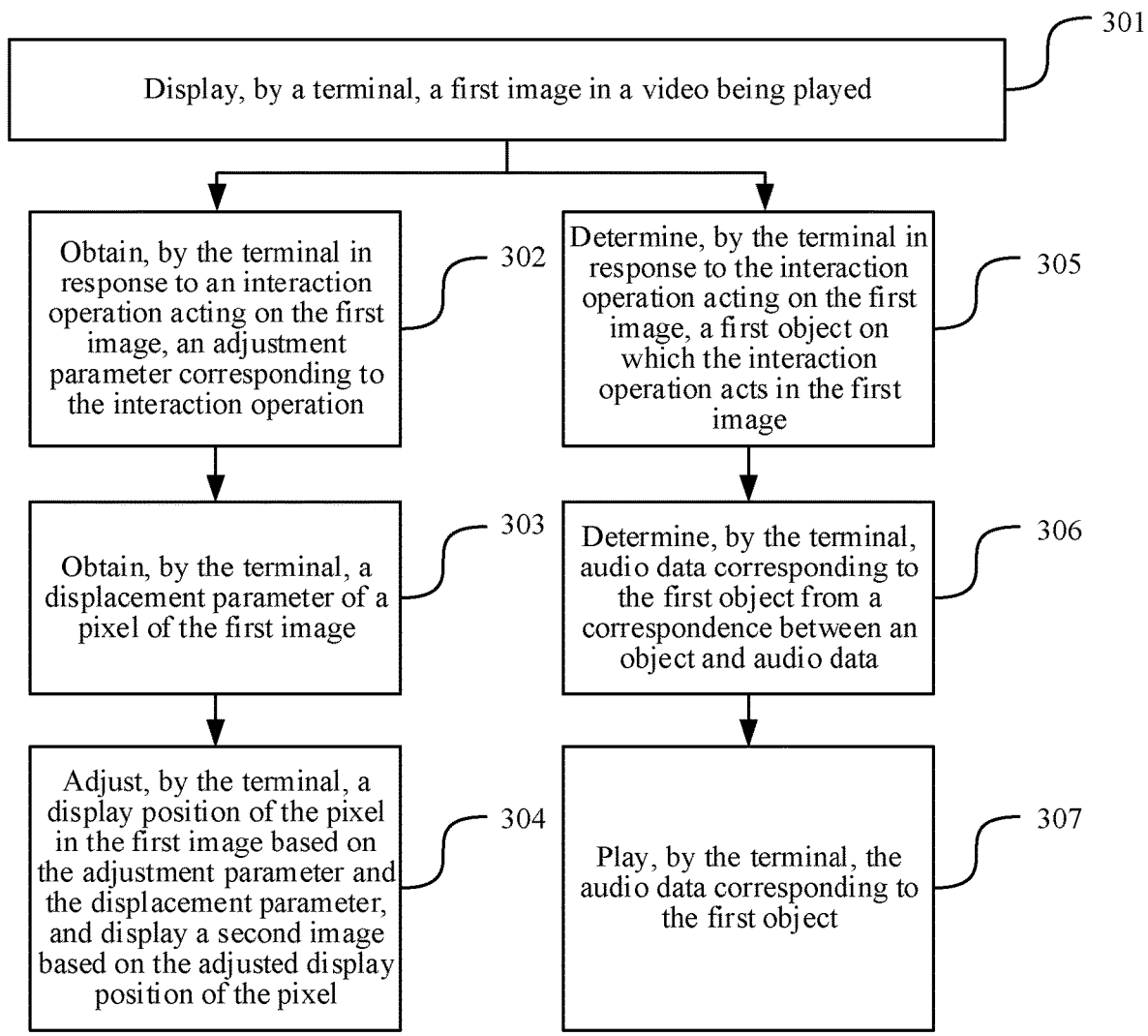
FIG. 3 is a flowchart of a video processing method according to an embodiment of this disclosure.

FIG. 3 is a flowchart of a video processing method according to an embodiment of this disclosure. Referring to FIG. 3, in this embodiment of this disclosure, an example in which the video interactive playing is implemented by a terminal is used for description. That is, the terminal provides feedback to the interaction operation of the user by superimposing the action effect of the interaction operation on the video, so as to implement the video interactive playing.

In step 301, a first image is displayed by a terminal in a video being played.

A plurality of frames of images are rapidly and successively displayed to form a video. The process of the terminal performing video playing is divided to processes of the terminal sequentially displaying a plurality of frames of images. The playing and processing of a video by the terminal is also the display and processing of images in the video.

The terminal supports video interactive playing of any video type. In an implementation, the terminal performs video interactive playing by default.

In another implementation, the terminal performs video interactive playing in a case that an interactive playing mode is on. The terminal provides an on/off switch of the interactive playing mode, and the user may control the on/off of the interactive playing mode through the on/off switch of the interactive playing mode. The terminal determines, in response to the on/off switch of the interactive playing mode being turned on, that the interactive playing mode is on; and the terminal determines, in response to the on/off switch of the interactive playing mode being turned off, that the interactive playing mode is off.

For example, in a case that the terminal is a smartphone, the user can watch a video through a video playing application on the terminal. The terminal runs the video playing application in response to a start operation on the video playing application. After opening the video playing application, the user can select a video to watch through an application interface of the video playing application. The terminal displays the application interface of the video playing application; and plays the video in response to a click operation on the video in the application interface. After opening the video, the user can start the interactive playing mode according to needs. For example, the video playing interface includes an on/off switch of the interactive playing mode, and the terminal performs video interactive playing in response to the on/off switch of the interactive playing mode being turned on.

In a case that the terminal is a VR device or a smart TV, the user can control the terminal to enter the interactive playing mode through a voice instruction or a gesture operation. In a case that the terminal is a smart TV, the user can also control the terminal to enter the interactive playing mode by pressing an interaction button on a remote control of the smart TV. The manner in which the terminal enters the interactive playing mode is not limited in this embodiment of this disclosure.

In actual applications, the terminal mainly supports video interactive playing of a target video type. Compared with a video of another video type other than the target video type, the user has higher video interaction requirements for the video of the target video type. For example, the target video type includes nature documentaries, astronomy documentaries, food documentaries, VR films, and the like.

An image currently displayed in a video being played by the terminal is a first image, and in this embodiment of this disclosure, the first image is used as an example for describing a video processing process.

In step 302, in response to an interaction operation acting on the first image, an adjustment parameter corresponding to the interaction operation is obtained by the terminal.

In one example, the interaction operation is a touch operation on a display screen of the terminal, and the interaction operation acts on the display screen in a case that the first image is displayed on the display screen of the terminal. In another example, the interaction operation is a hand operation captured by a hand operation sensing apparatus of a VR device. In a case that the VR device displays the image, an interaction operation acting on the image is captured by the hand operation sensing apparatus.

The adjustment parameter described above is used for adjusting a display position of a pixel in the first image, so that an action effect of the interaction operation is presented in a second image displayed after the first image. The adjustment parameter is a vector with a size and a direction, indicating the magnitude of a displacement to which a display position of a pixel is adjusted. The adjustment parameter includes an offset distance and an offset direction that are used for adjusting the display position of a pixel. That is, the adjustment parameter indicates an adjustment range of the display position of a pixel in the first image based on the interaction operation, and the adjustment range refers to the range of adjusting the display position of the pixel on the basis of the original displacement of the pixel.

In an implementation, the terminal obtains an adjustment parameter matching an action force of an interaction operation, so as to manifest an action effect of the interaction operation according to the action force. Correspondingly, in response to the interaction operation acting on the first image, the terminal obtains the adjustment parameter corresponding to the interaction operation through the following step 3021 and step 3022.

In step 3021, an action force of the interaction operation is obtained by the terminal in response to the interaction operation acting on the first image.

For example, a lower layer of the display screen of the terminal is provided with a pressure sensor. The terminal identifies the action force of the interaction operation through the pressure sensor.

In step 3022, based on the action force of the interaction operation, the adjustment parameter matching the action force is determined by the terminal.

The action force is positively correlated with the adjustment parameter, the greater the action force, the greater the adjustment parameter.

In an implementation, the terminal determines an adjustment parameter corresponding to a current action force according to a correspondence between a maximum force and a maximum adjustment parameter. The maximum force may be referred to as a reference action force, and the maximum adjustment parameter may be referred to as a reference adjustment parameter. Correspondingly, the step 3022 described above includes: determining, by the terminal, the adjustment parameter based on the reference action force, the reference adjustment parameter corresponding to the reference action force, and the action force of the interaction operation, the adjustment parameter being positively correlated with the reference adjustment parameter, the adjustment parameter being negatively correlated with the reference action force, and the adjustment parameter being positively correlated with the action force of the interaction operation. The adjustment parameter is a vector with a direction, and the direction of the adjustment parameter is consistent with the direction of the action force of the interaction operation.

The process described above is also a process in which the terminal determines the adjustment parameter through the following formula 1.

$$\Delta W_i = \Delta W \times \frac{F_i}{F_m}, \quad \text{Formula 1}$$

where $\Delta W_i$ represents an adjustment parameter corresponding to an action force of an interaction operation acting on an i frame image, $\Delta W_i$ is a vector with a direction, the modulus of $\Delta W_i$ is a non-negative number, and i is a positive integer. $\Delta W$ represents a reference adjustment parameter corresponding to a reference action force, $\Delta W$ is a scalar, and $\Delta W$ is a non-negative number. $F_i$ represents the action force of the interaction operation acting on the i frame image, $F_i$ is a vector with a direction, and the modulus of $F_i$ is a non-negative number. $F_m$ represents the reference action force, $F_m$ is a scalar, and $F_m$ is a non-negative number.

For example, the reference action force is 1 N (unit of force: Newton), the reference adjustment parameter is 10 mm. In a case that the action force of the interaction operation is 0.2 N, the modulus of the adjustment parameter matching the action force is 2 mm.

In another implementation, the terminal determines an adjustment parameter corresponding to an action force of an interaction operation based on a reference adjustment parameter corresponding to a unit action force and the action force of the interaction operation. Correspondingly, the step of determining, by the terminal based on the action force of the interaction operation, the adjustment parameter matching the action force includes: obtaining, by the terminal, a reference displacement corresponding to the unit action force; determining a ratio of the action force of the interaction operation to the unit action force as a reference quantity; and determining a product of the reference quantity and the reference adjustment parameter as the modulus of the adjustment parameter, and determining a direction of the action force of the interaction operation as a direction of the adjustment parameter.

For example, the unit action force is 0.1 N, and the reference adjustment parameter corresponding to the unit action force is 1 mm. In a case that the action force of the interaction operation is 0.2 N, the modulus of the adjustment parameter matching the action force is 2 mm.

In the technical solutions described above, by identifying an action force of an interaction operation, an adjustment parameter matching the action force is determined, and a display position of a pixel in a first image is adjusted, so that an action effect of the pixel after adjustment can be made corresponding to the action force of the interaction operation. Therefore, a more realistic interaction effect is presented, the real motion sense of video interaction is improved, the video playing performance can meet richer interaction requirements, and the experience mode during a video playing process is further expanded.

In another implementation, the terminal determines a displacement of a hand movement in a case that the user performs an interaction operation as an adjustment parameter. Correspondingly, the step of obtaining, by the terminal in response to an interaction operation acting on the first image, an adjustment parameter corresponding to the interaction operation includes: obtaining, by the terminal in response to the interaction operation acting on the first image, a starting position point of the interaction operation acting on the first image and an end position point of the interaction operation acting on the first image; and determining a displacement from the starting position point to the end position point as the adjustment parameter.

To ensure that the action effect of the interaction operation can be presented in the second image, and the second image can be displayed according to a first frame rate, the terminal determines a first duration between a time point at which the first image starts to be displayed and a time point at which the interaction operation is detected, in a case that a sum of the first duration and a target duration is not greater than a display interval between two frames of images, and in a case that a duration of the interaction operation acting on the first image reaches the target duration, the terminal determines a position point at which the interaction operation acts on the first image as the end position point; or in a case that the sum of the first duration and the target duration is greater than the display interval between the two frames of images, the terminal determines a position point at which the interaction operation acts on the first image when the first image is finally displayed as the end position point, then determines the adjustment parameter, and adjusts the display position of the pixel according to the adjustment parameter. The target duration represents, in a case that the user performs an interaction operation, an effective duration of the interaction operation acting on the first image, and the target duration is any duration not greater than the time interval between two frames of images.

For example, in a case that the first frame rate is 30 frames per second, the display interval between the two frames of images is 0.033 seconds, the target duration is 0.02 seconds, and the terminal triggers an interaction operation in a case that a display duration of the first image reaches 0.01 seconds, and when a duration of the interaction operation acting on the first image reaches 0.02 seconds, a position point of the interaction operation acting on the first image is determined as the end position point; or in a case that the interaction operation is triggered when the display duration of the first image reaches 0.02 seconds, and when the duration of the interaction operation acting on the first image reaches 0.012 seconds, the position point of the interaction operation acting on the first image is determined as the end position point.

The terminal is a smartphone, a tablet computer, a notebook computer, a desktop computer, a smart TV, or the like, and a display screen of the terminal can detect a position point on which an interaction operation acts. In an embodiment, the display screen of the terminal is a resistive touch screen, a capacitive touch screen, an infrared touch screen, a surface acoustic touch screen, or the like. Different types of the display screen of the terminal have different principles of detecting the position point on which the interaction operation acts. The principle in which the display screen of the terminal detects the position point on which the interaction operation acts is not limited in this embodiment of this disclosure.

In step 303, a displacement parameter of a pixel of the first image is obtained by the terminal.

The displacement parameter may also be referred to as an optical flow estimation parameter, and the displacement parameter represents the displacement of the pixel of the first image between the first image and the second image. The second image is an image displayed after the first image.

In an implementation, the terminal predicts the displacement parameter of the pixel of the first image through an optical flow estimation model. The step 303 described above includes: inputting, by the terminal, the first image into an optical flow estimation model to obtain the displacement parameter of the pixel of the first image.

The optical flow estimation model is used for predicting a displacement of a pixel of a current frame image to the next frame image. In an embodiment, the optical flow estimation model is a prediction model trained by FlowNet (optical flow neural network). In a training process of the optical flow estimation model, the optical flow estimation is performed on a plurality of pairs of training images through the optical flow neural network; and based on a displacement parameter outputted by the optical flow neural network and a real displacement parameter, a network parameter of the optical flow neural network is updated, so that the displacement parameter outputted by the optical flow neural network is as close as possible to a real optical flow estimation parameter.

In the technical solutions described above, a displacement parameter of a pixel of a frame of image is predicted through an optical flow estimation model, and the optical flow estimation model can be used for predicting a displacement parameter of an image in a video of any format, thereby supporting interactive playing of any video and expanding the application scope of video interactive playing.

In another implementation, encoded data of a video includes a displacement parameter of a pixel of an image in the video, that is, the encoded data includes a displacement parameter encoded, and the terminal can decode the encoded data of the video, to obtain the displacement parameter of the pixel of the image. The displacement parameter is predetermined during an encoding process of the video and encoded into the encoded data of the video. The displacement parameter is predetermined by a computer device used for video encoding according to the change of the displacement of a pixel between two adjacent frames of images.

In the technical solutions described above, by pre-encoding a displacement parameter of a pixel in an image in encoded data of a video, in a video playing process, the displacement parameter of the pixel can be directly decoded from the encoded data of the video, and then video processing can be performed based on the directly decoded displacement parameter, which can improve the efficiency of video processing.

The displacement parameter of the pixel in the image may also be calculated by other optical flow estimation algorithms, such as Lucas-Kanade (a two-frame difference optical flow estimation algorithm) algorithm, Horn-Schunck (an optical flow estimation algorithm for estimating a dense optical flow field of an image) algorithm, or the like. The manner for obtaining the displacement parameter is not limited in this embodiment of this disclosure.

In this embodiment of this disclosure, an example in which the adjustment parameter is obtained first and then the displacement parameter is obtained is used for description. However, in some embodiments, the step of obtaining, by the terminal, the adjustment parameter, and the step of obtaining, by the terminal, the displacement parameter described above may also be performed according to other time sequences. In an embodiment, the terminal obtains the adjustment parameter and the displacement parameter simultaneously; or the terminal first obtains the displacement parameter and then obtains the adjustment parameter, which is not limited in this embodiment of this disclosure.

In step 304, a display position of the pixel in the second image is adjusted by the terminal based on the adjustment parameter and the displacement parameter, and the second image is displayed based on the adjusted display position of the pixel.

The terminal superimposes an action effect of an interaction operation on an operation region on which the interaction operation acts. The terminal, in response to the pixel being a pixel on which the interaction operation acts, enables the pixel to offset from an original display position to a target display position based on the adjustment parameter and the displacement parameter; and the terminal, in response to the pixel being a pixel on which the interaction operation does not act, enables the pixel to offset from the original display position to the target display position based on the displacement parameter, to display a target image. The target image is an image displayed after the first image, and the target image may be referred to as the second image. That is, the terminal adjusts, based on the adjustment parameter and the displacement parameter, the display position of the pixel on which the interaction operation acts; and the terminal adjusts, based on the displacement parameter, the display position of the pixel on which the interaction operation does not act, and then displays the second image based on the adjusted display position of the pixel. The terminal enables the pixel to offset from the original display position to the target display position by adjusting the display position of the pixel. The original display position is a display position of the pixel in the first image, and the target display position is a display position of the pixel in the second image after adjustment.

For example, for an animal documentary in which animals are subject objects in natural documentaries, in a case that an interaction operation acts on a fur region of the animals, based on the process described above, a pixel on which the interaction operation acts is offset, so that the deformation of the fur of the animals can be presented in the second image, thereby producing a flicking effect on the fur of the animals. For a natural landscape documentary in which natural landscapes are subject objects in nature documentaries, in a case that an interaction operation acts on a region of a river, an action direction of the interaction operation is the same as a flowing direction of the river, based on the process described above, a pixel on which the interaction operation acts is offset, so that an action effect of accelerating a flow of water can be presented in the second image. In a case that an interaction operation acts on a region of snow, based on the process described above, a pixel on which the interaction operation acts is offset, so that a changing effect of snow can be presented in the second image.

In the technical solutions described above, in combination with an adjustment parameter corresponding to an interaction operation, a pixel is offset, and an action effect of the interaction operation is superimposed on an operation region on which the interaction operation acts. Therefore, the action effect of the interaction operation is highlighted in a second image, and an interaction operation of a user is fed back through the deformation on a video screen, which enriches the video interactive effect, implements the video interactive playing, and expands the experience mode during a video playing process.

In addition, the offset processing of a pixel in an image based on a displacement parameter makes full use of previously learned knowledge of video playing, and reduces the complex video understanding and calculation, and the video processing requires relatively small computation and is easy to deploy, thereby improving the efficiency of video processing and expanding the application scope of video interactive playing.

In an embodiment, the step in which the pixel is offset from an original display position to a target display position based on the adjustment parameter and the displacement parameter described above includes: determining, by the terminal, a target offset parameter based on the adjustment parameter and the displacement parameter in response to the pixel being a pixel on which the interaction operation acts; and enabling, by the terminal, the pixel to offset from the original display position to the target display position based on an offset distance and an offset direction that are indicated by the target offset parameter, that is, adjusting, by the terminal based on the offset distance and the offset direction that are indicated by the target offset parameter, the display position of the pixel on which the interaction operation acts in the first image. In an embodiment, based on the vector summation method such as the triangle rule, the parallelogram rule, or the coordinate system solution method, the terminal adds the adjustment parameter and the displacement parameter to obtain the target offset parameter.

In the technical solutions described above, a target offset parameter is determined first based on an adjustment parameter and a displacement parameter, so that a pixel can be offset from an original display position to a target display position at one time based on the target offset parameter, which improves the offset efficiency of the pixel, and further improves the efficiency of video processing.

The terminal may alternatively first enable the pixel to offset from the original display position to a middle display position based on the displacement parameter; and then enable the pixel to offset from the middle display position to the target display position based on the adjustment parameter. That is, the terminal first adjusts the display position of the pixel in the first image based on the displacement parameter, and then adjusts, based on the adjustment parameter on the basis of the adjustment, the display position of the pixel at which the interaction operation acts. The process of the pixel offsetting from the original display position to the target display position is not limited in this embodiment of this disclosure.

It is an auxiliary function to superimpose the action effect of the interaction operation during a video playing process, so as to enrich the video viewing experience of a user. While superimposing the action effect of the interaction operation, an original motion trend of an object in a video still has to be maintained. For example, a motion trend of an animal in a video is to walk forward, and an interaction operation on the fur of the animal does not affect the motion trend of the animal to walk forward. In this embodiment of this disclosure, by assigning a specific weight to an interaction operation, an action effect of the interaction operation does not affect an original motion trend of an object in a video. Correspondingly, the step of enabling, by the terminal, the pixel to offset from the original display position to the target display position based on the adjustment parameter and the displacement parameter, to display the second image includes: obtaining, by the terminal, a weight corresponding to the interaction operation, the weight indicating a degree of influence of the interaction operation on an offset of the display position of the pixel; and weighting, by the terminal, the adjustment parameter based on the weight, and enabling the pixel to offset from the original display position to the target display position based on the weighted adjustment parameter and the displacement parameter, to display the second image, that is, weighting the adjustment parameter based on the weight, and adjusting the position of the pixel in the first image based on the weighted adjustment parameter and the displacement parameter. The weight may also be referred to as an influence weight.

The process of adjusting, by the terminal, the pixel in the first image based on the weight, the adjustment parameter, and the displacement parameter, to display the second image is implemented based on the following formula 2:

$$\text{Image}_{i+1} = \text{Image}_i + \text{Flow}_i + \lambda \times \Delta W_i, \text{ where} \qquad \text{Formula 2:}$$

Image$_{i+1}$ represents an i frame image corresponding to an i+1 frame image, and i is a positive integer. Image$_1$ represents the i frame image, and the i frame image is an image on which an interaction operation acts. Flow$_i$ represents a displacement parameter of the i frame image, Flow$_i$ is a vector with a direction, and the modulus of Flow$_i$ is a non-negative number. λ represents a weight, and λ is greater than 0 and less than or equal to any numerical value of 1. ΔW$_i$ represents an adjustment parameter corresponding to an action force of an interaction operation acting on the i frame image, ΔW$_i$ is a vector with a direction, and the modulus of ΔW$_i$ is a non-negative number. The formula 2 described above indicates: For a pixel in the i frame image on which the interaction operation acts, based on the weight, the adjustment parameter corresponding to the interaction operation is weighted; and the weighted adjustment parameter and the displacement parameter are summed, and based on a summation result, the pixel is offset from the original display position to the target display position, and the second image is displayed.

In the technical solutions described above, by assigning a specific weight to an adjustment parameter corresponding to an interaction operation, the superposition of an action effect of the interaction operation does not affect an original motion trend of an object in a video, the video can be played normally according to an original progress, and the interactive effect is further enriched on the basis of ensuring the video viewing experience of a user.

In a case that the terminal does not detect an interaction operation acting on the first image, the terminal may directly display the second image without obtaining the adjustment parameter corresponding to the interaction operation.

In the technical solutions provided in the embodiments of this disclosure, because a displacement parameter can represent a displacement of a pixel changing between a first image and a second image, and in a case that an interaction operation acts on the first image of a video, the interaction operation may affect the displacement of the changing pixel, a display position of a pixel of the first image is adjusted in combination with the displacement parameter and an adjustment parameter, so that an action effect of the interaction operation can be presented on the second image displayed after the first image. Thus, the video presents a dynamic effect with a higher degree of matching with the interaction operation, interaction between a user and the video being played is supported, the interactivity of the video is enhanced, and the visual effect during a video playing process is improved.

In addition to superimposing the action effect of the interaction operation on the image displayed later to visually enhance the video interaction experience, the terminal also plays, through the following step 305 to step 307, audio data of an object on which the interaction operation acts, and performs corresponding sound feedback, to further enrich the video interaction effect.

In step 305, in response to the interaction operation acting on the first image, a first object on which the interaction operation acts in the first image is determined by the terminal.

At least one object exists in the first image. For example, in a case that the first image is an image included in a nature documentary, there are objects such as animals, trees, rivers, and grass in the first image. Each object in the first image occupies a region in the first image for presentation.

In an embodiment, the terminal determines, based on the semantic segmentation, a first object on which the interaction operation acts. Correspondingly, the step 305 described above includes: performing, by the terminal, semantic segmentation on the first image in response to the interaction operation acting on the first image, to obtain at least one first pixel region, that is, determining, by the terminal, at least one first pixel region of the first image in response to the interaction operation acting on the first image, each first pixel region including an object; determining, by the terminal from the at least one first pixel region, a first target region on which the interaction operation acts; and determining an object in the first target region as the first object. The performing semantic segmentation on the first image refers to identifying an object in the first image, and dividing the first image into at least one first pixel region according to the identified object, so that each first pixel region includes one object.

Each first pixel region is used for representing an object in the first image. For example, in a case that the first image includes a lion, a grass, and a river, semantic segmentation is performed on the first image to obtain a first pixel region used for representing the lion, a first pixel region used for representing the grass, and a first pixel region used for representing the river. In a case that an interaction operation acts on the first pixel region used for representing the lion, a first object on which the interaction operation acts is the lion.

In the technical solutions described above, an image is divided into, through semantic segmentation, a plurality of regions used for representing different objects, each region represents an object in a first image, and an object in a region on which an interaction operation acts is determined as a first object on which the interaction operation acts. Because the semantic segmentation divides a region from the pixel level, a border of the divided region is more refined, so that an object on which an interaction operation acts can be more accurately determined. Further, audio data being played can match the object on which the interaction operation acts, so that the playing of the audio data is more in line with a real scene, and the video interactive experience is further improved.

The terminal can perform semantic segmentation on the first image through an image segmentation model, to obtain at least one first pixel region. In one example, a network structure of the image segmentation model is based on convolutional neural networks (CNN). The image segmentation model is an encoder-decoder architecture. An encoder of the image segmentation model captures local features in a first image through convolutional layers, and nests a plurality of modules configured to capture the local features of the first image in a hierarchical manner, thereby extracting complex features of the first image, and encoding the content of the first image into a compact representation. That is, the encoder obtains a feature map by encoding the first image, a size of the feature map being less than a size of the first image, and the feature map being capable of representing a category label to which each pixel belongs, then inputs the feature map to a decoder of the image segmentation model, and performs upsampling through the transposed convolution in the decoder, thereby expanding the feature map to the same size as the first image, and generating an array used for representing the category label of each pixel in the first image, the first pixel region including a plurality of pixels with the same category label.

Due to a correlation between a plurality of adjacent frame images in a video, objects included in the plurality of frame images are the same, and positions of the same object in the plurality of frame images are different. Therefore, after semantic segmentation of one frame of image, pixels in the same pixel region can be tracked based on optical flow estimation, so that a pixel region used for representing different objects can be determined in the next frame of image through pixel tracking.

Therefore, after performing semantic segmentation on the first image in response to the interaction operation acting on the first image, to obtain at least one first pixel region, the terminal determines, in a case that the interaction operation acts on the second image, an object on which the interaction operation acts in the second image, and plays audio data corresponding to the object through the following steps, including: determining, by the terminal, a second pixel region of the second image based on a target display position of a pixel whose original display position is in the first pixel region in the second image, the original display position of the pixel in the second pixel region being within the first pixel region, that is, determining, by the terminal, at least one second pixel region of the second image based on the pixel in the at least one first pixel region and the display position of the pixel after adjustment, the at least one second pixel region being corresponding to one first pixel region, and the original display position of the pixel in the second pixel region being in the corresponding first pixel region; determining, by the terminal in response to an interaction operation acting on the second image, a second target region on which the interaction operation acts from the at least one second pixel region; and determining, by the terminal, an object in the second target region as a second object, and playing audio data corresponding to the second object.

In the technical solutions described above, after a plurality of pixel regions used for representing different objects in a frame of image are determined through semantic segmentation, pixels can be tracked based on optical flow estimation, to obtain a plurality of pixel regions in one or more frames of images after the frame of image, and a plurality of pixel regions in an image can be obtained without semantic segmentation of each frame of image. The time consumed by the semantic segmentation for a plurality of times is saved, the efficiency of determining an object on which an interaction operation acts is improved, the efficiency of sound feedback can be further improved, and the video interaction experience can be further improved.

The terminal may also determine, through methods such as target detection, classification and positioning, or instance segmentation, the object on which the interaction operation acts. The process of determining the object on which the interaction operation acts is not limited in this embodiment of this disclosure.

In step 306, audio data corresponding to the first object is determined from correspondences between objects and audio data.

In an implementation, encoded data of a video includes a correspondence between an object and audio data, and the terminal can decode the encoded data of the video, to obtain the correspondence between an object and audio data; and determine audio data of a first object from the correspondence between an object and audio data.

In another implementation, a server stores the correspondence between an object and audio data, the terminal can send an audio data obtaining request to the server, and the audio data obtaining request is used for requesting to obtain the audio data corresponding to the first object. The server receives the audio data obtaining request of the terminal; determines the audio data corresponding to the first object from the stored correspondences between objects and audio data; and returns the audio data to the terminal. The terminal receives the audio data returned by the server. In an embodiment, the server stores the correspondences between objects and audio data in an audio database.

Before a computer device used for video encoding encodes the correspondence between an object and audio data into encoded data, or the server determines the audio data corresponding to the first object from the stored correspondence between an object and audio data, the correspondence between an object and audio data is also generated. In this embodiment of this disclosure, an example in which the server generates the correspondence between an object and audio data is used for description. The process of generating the correspondence between an object and audio data by the computer device used for video encoding is the same as the process of generating the correspondence between an object and audio data by the server.

The step in which the server generates the correspondence between an object and audio data includes the following step 1 to step 3.

In Step 1, the server determines a subject object (main object) in a video.

The subject object is an object highlighted in the video. For example, in a natural documentary, the subject object is forests, animals, rivers, or the like; in an astronomical documentary, the subject object is stars, gases, or the like, in the universe; and in a food documentary, the subject object is various ingredients.

In an embodiment, the server performs semantic segmentation on an image in the video, to determine an object in the image; divides the video into a plurality of video clips; determines a frequency of each object appearing in the video clips; determines a ratio of the frequency of each object appearing in the video clips to a sum of frequencies of objects appearing in the video clips as an appearing proportion of the each object; and determines an object whose proportion is greater than a reference threshold as the subject object. The server divides the video into a plurality of video clips according to a fixed duration. For example, a total duration of the video is 1 hour, and the server intercepts one video clip every 5 minutes. The reference threshold is a preset threshold greater than 0 and less than 1, for example, the reference threshold is 0.8, 0.9, or the like.

In Step 2, the server obtains audio data of the subject object.

In an implementation, the server extracts the audio data of the subject object from video clips in which the subject object (main object) exists in the video. For example, for an animal documentary, in a case that the animal documentary includes a lion, the server extracts audio data of the lion from video clips in which the lion appears.

In a case that the subject object is a forest or an animal, in a process of extracting the audio data of the subject object, it is advantageous to filter out a video clip greatly affected by human voice first, and determine a video clip in which audio data of a subject object is relatively simple for audio extraction. For example, audio data of a natural documentary usually includes narration. Video clips with narration are the video clip greatly affected by human voice, and video clips without narration are the video clip in which audio data of a subject object is relatively simple. In a case that there is no video clip with relatively simple audio data in the video clip, the server can perform noise reduction filtering on a video clip with human voice, and extract audio data of a subject object.

In another implementation, the server obtains the audio data of the subject object from other audio data sources including the subject object. For example, for a nature landscape documentary or an astronomical documentary, the subject object is a mountain, a starry sky, or the like, the subject object is a static target, and in a video in which the subject object is located, audio data of the subject object is less, and the audio data needs to be supplemented through other audio data sources. In a case that the subject object is a stone mountain, audio data of touching a stone is obtained from other audio data sources. In a case that the subject object is a starry sky, audio data of a wind chime is obtained from an audio data source. In another example, for an animal video, the friction sound of animal hair is obtained through other audio data sources.

In an embodiment, before obtaining the audio data of the subject object, the server classifies, according to a video type, a plurality of videos to which a video interactive playing function needs to be added, for example, divides the plurality of videos into natural landscape videos in which the audio data of the subject object is not easy to be extracted and animal videos in which the audio data of the subject object is relatively abundant. For a natural landscape video, audio data is extracted from other audio data sources. For an animal video, the audio data of the subject object is extracted from a video clip in which the subject object exists in the video.

In Step 3, the server generates a correspondence between a subject object and audio data of the subject object.

After obtaining the audio data of the subject object, the server generates the correspondence between the subject object and audio data of the subject object. During a subsequent process of playing the video, the terminal can obtain corresponding audio data from the server for playing, which enriches the audio-visual experience of a video interactive playing process. In an embodiment, the server stores the correspondence between a subject object and audio data of the subject object in an audio database.

In step 307, the audio data corresponding to the first object is played by the terminal.

The terminal plays the audio data corresponding to the first object. In an embodiment, the terminal plays the audio data corresponding to the first object while playing original audio data of the video. In an embodiment, the volume of the audio data corresponding to the first object played by the terminal is greater than the volume of the original audio data of the video being played, so as to highlight the sound feedback effect generated by an interaction operation.

In the technical solutions provided in this embodiment of this disclosure, according to one aspect, an action effect of an interaction operation is presented on a second image to visually display the feedback on the interaction operation, and according to another aspect, audible feedback on the interaction operation is showed by playing audio data of an object on which the interaction operation acts. Therefore, in both visual and auditory terms, during a video playing process, the feedback on the interaction operation of a user can be given, which can implement the video interactive playing and improve the audio-visual effect during the video interactive playing.

In an embodiment, the terminal also implements sound feedback of different volumes in combination with an action force of the interaction operation. Correspondingly, the step 307 described above includes: obtaining, by the terminal, a playing volume corresponding to an action force of the interaction operation; and playing, by the terminal, the audio data corresponding to the first object based on the playing volume. The action force is positively correlated with the playing volume, the greater the action force, the greater the playing volume.

In an embodiment, the terminal determines the playing volume corresponding to the action force based on a volume conversion parameter and the action force. For example, the action force is 0.1 N, the volume conversion parameter is 400, and the playing volume is 40. Alternatively, the terminal stores a correspondence between an action force and a playing volume, and determines the playing volume based on the correspondence. Alternatively, the terminal requests the server to return the playing volume corresponding to the action force by sending a volume conversion request to the server. The process of obtaining, by the terminal, a playing volume corresponding to the action force of the interaction operation is not limited in this embodiment of this disclosure.

In the technical solutions described above, the sound feedback of different volumes can be implemented according to an action force of an interaction operation, thereby further improving the audio-visual effect of video interactive playing and enriching the video interactive experience.

In this embodiment of this disclosure, an example in which the terminal sequentially performs the step 302 to the step 307 is used for description. In some embodiments, the terminal may also perform the step 302 to the step 307 according to other time sequences. In an embodiment, the terminal simultaneously performs the step 302 to the step 304 and the step 305 to the step 307; or the terminal first performs the step 305 to the step 307, and then performs the step 302 to the step 304, which is not limited in this embodiment of this disclosure. In an embodiment, while displaying the second image, the terminal plays the audio data corresponding to the first object, so that the visual effect and the sound effect generated by the interaction operation are generated synchronously, so as to enhance the motion sense of the user and further improve the audio-visual effect.

Figure 4:
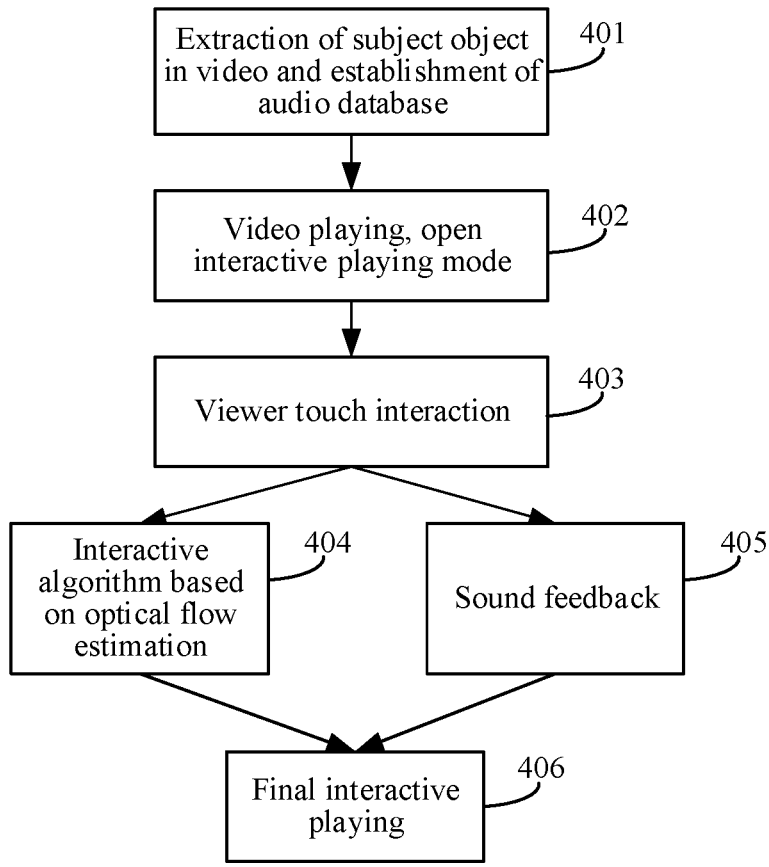
FIG. 4 is a flowchart of video interactive playing according to an embodiment of this disclosure.

To make the video interactive playing process clearer, the following description is made with reference to FIG. 4. Referring to FIG. 4, before the video interactive playing process starts, a step 401 is further included: extracting a subject object in a video and establishing an audio database. The step 401 may be implemented through the step 1 to the step 3 of generating the correspondence between an object and audio data in the step 306. The video interactive playing process includes: In step 402, a video is playing, a viewer turning on an interactive playing mode, and a terminal displaying a first image in the video through the step 301 described above. In step 403, a viewer touch interaction is received. In step 404, an interactive algorithm is performed based on optical flow estimation, the terminal displaying a second image based on the optical flow estimation through the step 302 to the step 304 described above, and presenting an action effect of a touch interaction. In step 405, sound feedback is generated, the terminal playing, through the step 305 to the step 307 described above, audio data of an object on which an interaction operation of the viewer acts, to implement the sound feedback. In step 406, in final interactive playing, the terminal playing, while displaying the second image, the audio data of the object on which the interaction operation acts, to implement the final interactive playing.

The terminal may need to present the visual effect caused by the interaction operation through the step 302 to the step 304 described above, and the terminal may not perform the step 305 to the step 307, to increase the sound effect caused by the interaction operation.

In this embodiment described above, an example in which the terminal performs the video interactive playing is used for description. In an embodiment, the video interactive playing is implemented through the interaction between the terminal and the server. For example, the first image is displayed in the video; in response to the interaction operation acting on the first image, a video processing request is sent to the server, to request the server to determine the second image; and the terminal receives the second image returned by the server, and displays the second image. The process for the server to determine the second image is the same as the process for the terminal to determine the second image. In an embodiment, the video processing request is also used for requesting the server to determine audio data corresponding to the interaction operation, and the terminal receives the audio data returned by the server and plays the audio data. The process for the server to determine the audio data corresponding to the interaction operation is the same as the process for the terminal to determine the audio data corresponding to the interaction operation.

All of the technical solutions described above can be combined to form other embodiments of this disclosure. Details are not described herein again.

Figure 5:
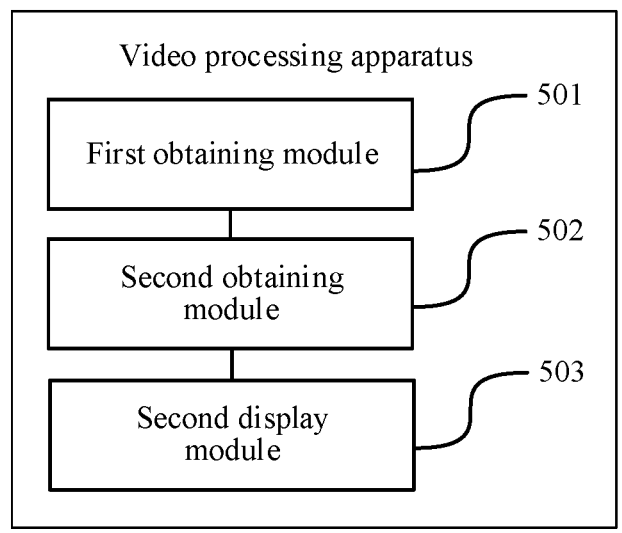
FIG. 5 is a block diagram of a video processing apparatus according to an embodiment of this disclosure.

FIG. 5 is a block diagram of a video processing apparatus according to an embodiment of this disclosure. Referring to FIG. 5, the apparatus includes: a first obtaining module 501, configured to obtain, in response to an interaction operation acting on a first image, an adjustment parameter corresponding to the interaction operation, the adjustment parameter indicating an adjustment range of a display position of a pixel in the first image based on the interaction operation, and the first image being an image currently displayed in a video being played; a second obtaining module 502, configured to obtain a displacement parameter of the pixel of the first image, the displacement parameter representing a displacement of the pixel between the first image and a second image, and the second image being an image displayed after the first image; a second display module 503, configured to adjust the display position of the pixel in the first image based on the adjustment parameter and the displacement parameter, and the second display module 503 being further configured to display the second image based on the adjusted display position of the pixel.

In the technical solutions provided in the embodiments of this disclosure, because a displacement parameter can represent a displacement of a pixel changing between a first image and a second image, and in a case that an interaction operation acts on the first image of a video, the interaction operation may affect the displacement of the changing pixel, a display position of a pixel of the first image is adjusted in combination with the displacement parameter and an adjustment parameter, so that an action effect of the interaction operation can be presented on the second image displayed after the first image. Thus, the video presents a dynamic effect with a higher degree of matching with the interaction operation, interaction between a user and the video being played is supported, the interactivity of the video is enhanced, and the visual effect during a video playing process is improved.

In an implementation, the first obtaining module 501 includes: a force obtaining module, configured to obtain an action force of the interaction operation in response to the interaction operation acting on the first image; and a parameter determining unit, configured to determine, based on the action force of the interaction operation, the adjustment parameter matching the action force.

In another implementation, the parameter determining unit is configured to: determine the adjustment parameter based on a reference action force, a reference adjustment parameter corresponding to the reference action force, and the action force of the interaction operation, the adjustment parameter being positively correlated with the reference adjustment parameter, the adjustment parameter being negatively correlated with the reference action force, and the adjustment parameter being positively correlated with the action force of the interaction operation.

In another implementation, the second obtaining module 502 is configured to input the first image into an optical flow estimation model to obtain the displacement parameter of the pixel of the first image; or the second obtaining module 502 is configured to decode encoded data of the video, to obtain the displacement parameter of the pixel of the first image, the encoded data including the displacement parameter encoded.

In another implementation, the second display module 503 includes: a pixel offset unit, configured to adjust, based on the adjustment parameter and the displacement parameter, the display position of the pixel on which the interaction operation acts in the first image.

In another implementation, the pixel offset unit is configured to: determine a target offset parameter based on the adjustment parameter and the displacement parameter; and adjust, based on an offset distance and an offset direction indicated by the target offset parameter, the display position of the pixel on which the interaction operation acts in the first image.

In another implementation, the second display module 503 is configured to: obtain a weight corresponding to the interaction operation, the weight being used for representing a degree of influence of the interaction operation on an offset of the display position of the pixel; and weight the adjustment parameter based on the weight, and adjust the display position of the pixel in the first image based on the weighted adjustment parameter and the displacement parameter.

In another implementation, the apparatus further includes: a first object determining module, configured to determine, in response to the interaction operation acting on the first image, a first object on which the interaction operation acts in the first image; an audio determining module, configured to obtain audio data corresponding to the first object from a correspondence between an object and audio data; and an audio playing module, configured to play the audio data corresponding to the first object.

In another implementation, the first object determining module is configured to: determine at least one first pixel region of the first image in response to the interaction operation acting on the first image, each first pixel region including an object; determine, from the at least one first pixel region, a first target region on which the interaction operation acts; and determine an object in the first target region as the first object.

In another implementation, the apparatus further includes: a pixel tracking module, configured to determine at least one second pixel region of the second image based on a pixel in the at least one first pixel region and an adjusted display position of the pixel, a second pixel region being corresponding to a first pixel region, and an original display position of a pixel in the second pixel region being in the corresponding first pixel region; the first object determining module, further configured to determine, in response to an interaction operation acting on the second image, a second target region on which the interaction operation acts from the at least one second pixel region; and determine an object in the second target region as a second object; and the audio playing module, further configured to play audio data corresponding to the second object.

In another implementation, the audio playing module is configured to: obtain a playing volume corresponding to an action force of the interaction operation; and play the audio data corresponding to the first object based on the playing volume.

In another implementation, the apparatus further includes: a second object determining module, configured to determine a subject object in the video; an audio extraction module, configured to extract audio data of the subject object from a video clip in which the subject object exists in the video; and a relationship generation module, configured to generate a correspondence between the subject object and the audio data of the subject object.

The division of the foregoing functional modules is merely used as an example for description when the video processing apparatus provided in the foregoing embodiments performs video processing. In actual applications, the foregoing functions may be allocated to and completed by different functional modules according to requirements, that is, an inner structure of a computer device is divided into different functional modules to implement all or a part of the functions described above. In addition, the video processing apparatus provided in the foregoing embodiments belongs to the same concept as the embodiments of the video processing method. For the specific implementation process, refer to the method embodiments, and the details are not described herein again.

In the embodiments of this disclosure, the computer device may be configured as a terminal or a server. In a case that the computer device is configured as a terminal, the terminal executes and implements the technical solutions provided in the embodiments of this disclosure. In a case that the computer device is configured as a server, the server executes and implements the technical solutions provided in the embodiments of this disclosure, or the technical solutions provided in the embodiments of this disclosure are implemented through interaction between the terminal and the server, which is not limited in the embodiments of this disclosure.

Figure 6:
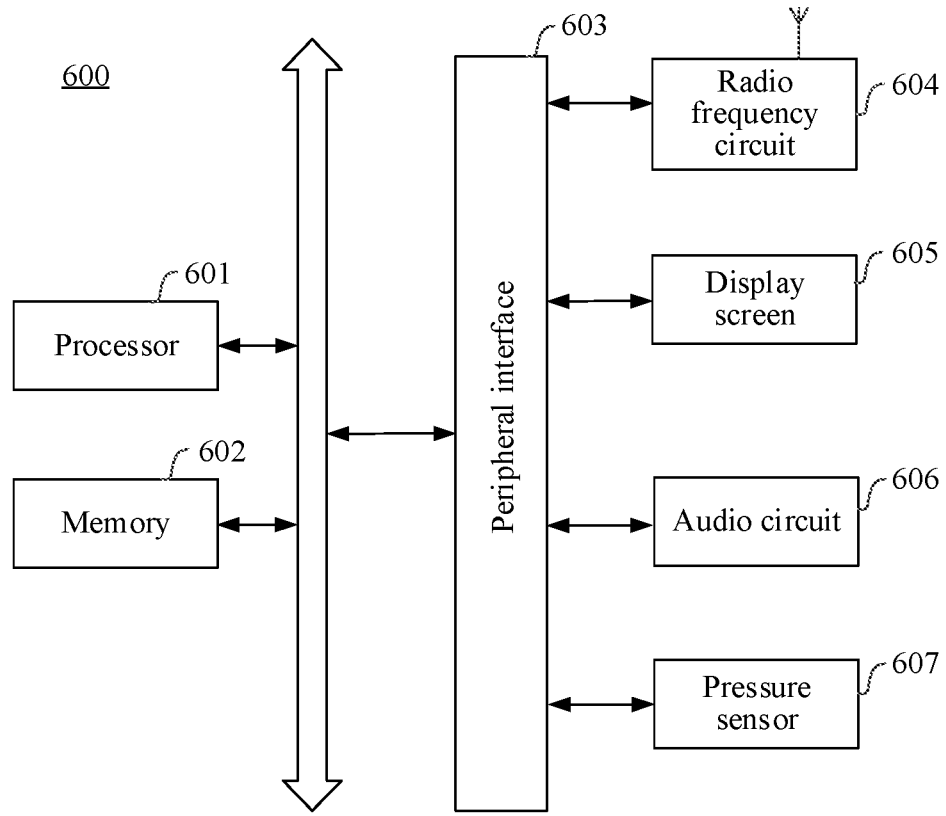
FIG. 6 is a block diagram of a terminal according to an embodiment of this disclosure.

In a case that the computer device is configured as a terminal, FIG. 6 shows a structural block diagram of a terminal 600 according to an exemplary embodiment of this disclosure. Generally, the terminal 600 includes: a processor 601 (including processing circuitry) and a memory 602 (including a non-transitory computer-readable storage medium).

The processor 601 may include one or more processing cores, such as a 4-core processor or an 8-core processor. The processor 601 may be implemented by at least one hardware form in a digital signal processing (DSP), a field-programmable gate array (FPGA), and a programmable logic array (PLA).

The memory 602 may include one or more computer-readable storage media, which may be non-transitory. In some embodiments, a non-transitory computer-readable storage medium in the memory 602 is configured to store at least one piece of program code, the at least one piece of program code being configured to be executed by the processor 601 to implement the video processing method provided in the method embodiments of this disclosure.

In some embodiments, the terminal 600 may include: a peripheral interface 603 and at least one peripheral. The processor 601, the memory 602 and the peripheral interface 603 may be connected by a bus or a signal line. Each peripheral may be connected to the peripheral interface 603 by a bus, a signal line, or a circuit board. Specifically, the peripheral includes: at least one of a radio frequency circuit 604, a display screen 605, and an audio circuit 606.

The peripheral interface 603 may be configured to connect at least one peripheral related to input/output (I/O) to the processor 601 and the memory 602.

The display screen 605 is configured to display a user interface (UI). The UI may include a graph, a text, an icon, a video, and any combination thereof. When the display screen 605 is a touch display screen, the display screen 605 also has the ability to collect a touch signal at or above the surface of the display screen 605. The touch signal may be input, as a control signal, to the processor 601 for processing. In this case, the display screen 605 may also be configured to provide virtual buttons and/or virtual keyboards, also referred to as soft buttons and/or soft keyboards.

The audio circuit 606 may include a microphone and a speaker. The microphone is configured to collect sound waves from a user and an environment and convert the sound waves into electrical signals that are inputted to the processor 601 for processing or to the radio frequency circuit 604 for voice communication. For purposes of stereo collection or noise reduction, there may be a plurality of microphones, which are respectively arranged at different parts of the terminal 600. The microphone may be alternatively a microphone array or an omnidirectional acquisition microphone. The speaker is configured to convert the electrical signals from the processor 601 or the radio frequency circuit 604 into sound waves.

In some embodiments, the terminal 600 further includes one or more pressure sensors 607. The pressure sensor 607 may be arranged on a side frame of the terminal 600 and/or a lower layer of the display screen 605. When the pressure sensor 607 is arranged on the side frame of the terminal 600, a grip signal of the user to the terminal 600 may be detected, and the processor 601 performs left and right hand recognition or quick operation according to the grip signal collected by the pressure sensor 607. When the pressure sensor 607 is arranged on the lower layer of the display screen 605, the processor 601 controls an operable control on the UI interface according to a pressure operation of the user on the display screen 605. The operable control includes at least one of a button control, a scroll-bar control, an icon control, and a menu control.

A person skilled in the art may understand that the structure shown in FIG. 6 does not constitute a limitation to the terminal 600, and the terminal may include more components or fewer components than those shown in the figure, or some components may be combined, or a different component deployment may be used.

Figure 7:
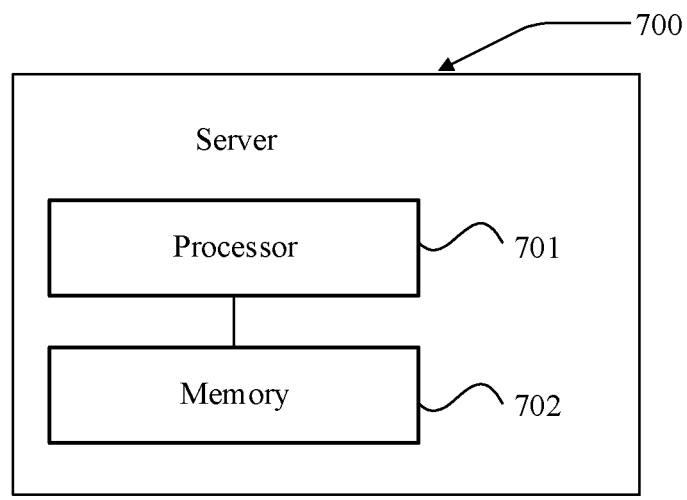
FIG. 7 is a block diagram of a server according to an embodiment of this disclosure.

In a case that the computer device is configured as a server, FIG. 7 is a block diagram of a server according to an embodiment of this disclosure. The server 700 may vary greatly due to different configurations or performance, and may include one or more central processing units (CPU) 701 and one or more memories 702. The memory 702 stores at least one piece of program code, the at least one piece of program code being loaded and executed by the processor 701 to implement the video processing method provided in the foregoing method embodiments. Certainly, the device may also have a wired or wireless network interface, a keyboard, an I/O interface and other components to facilitate I/O. The device may also include other components for implementing device functions. Details are not described herein again.

An embodiment of this disclosure further provides a computer device, including a processor and a memory, the memory storing at least one piece of program code, and the at least one piece of program code being loaded and executed by a processor to implement the following steps: obtaining, in response to an interaction operation acting on a first image, an adjustment parameter corresponding to the interaction operation, the adjustment parameter indicating an adjustment range of a display position of a pixel in the first image based on the interaction operation, and the first image being an image currently displayed in a video being played; obtaining a displacement parameter of the pixel of the first image, the displacement parameter representing a displacement of the pixel between the first image and a second image, and the second image being an image displayed after the first image; adjusting the display position of the pixel in the first image based on the adjustment parameter and the displacement parameter; and displaying the second image based on the adjusted display position of the pixel.

In an embodiment, the at least one piece of program code is loaded and executed by the processor to implement the following steps: obtaining an action force of the interaction operation in response to the interaction operation acting on the first image; and determining, based on the action force of the interaction operation, the adjustment parameter matching the action force.

In an embodiment, the at least one piece of program code is loaded and executed by the processor to implement the following steps: determining the adjustment parameter based on a reference action force, a reference adjustment parameter corresponding to the reference action force, and the action force of the interaction operation, the adjustment parameter being positively correlated with the reference adjustment parameter, the adjustment parameter being negatively correlated with the reference action force, and the adjustment parameter being positively correlated with the action force of the interaction operation.

In an embodiment, the at least one piece of program code is loaded and executed by the processor to implement the following steps: inputting the first image into an optical flow estimation model to obtain the displacement parameter of the pixel of the first image; and decoding encoded data of the video, to obtain the displacement parameter of the pixel of the first image, the encoded data including the displacement parameter encoded.

In an embodiment, the at least one piece of program code is loaded and executed by the processor to implement the following steps: adjusting, based on the adjustment parameter and the displacement parameter, the display position of the pixel on which the interaction operation acts in the first image.

In an embodiment, the at least one piece of program code is loaded and executed by the processor to implement the following steps: determining a target offset parameter based on the adjustment parameter and the displacement parameter; and adjusting, based on an offset distance and an offset direction indicated by the target offset parameter, the display position of the pixel on which the interaction operation acts in the first image.

In an embodiment, the at least one piece of program code is loaded and executed by the processor to implement the following steps: obtaining a weight corresponding to the interaction operation, the weight representing a degree of influence of the interaction operation on an offset of the display position of the pixel; and weighting the adjustment parameter based on the weight, and adjusting the display position of the pixel in the first image based on the weighted adjustment parameter and the displacement parameter.

In an embodiment, the at least one piece of program code is loaded and executed by the processor to implement the following steps: determining, in response to the interaction operation acting on the first image, a first object on which the interaction operation acts in the first image; obtaining audio data corresponding to the first object from a correspondence between an object and audio data; and playing the audio data corresponding to the first object.

In an embodiment, the at least one piece of program code is loaded and executed by the processor to implement the following steps: determining at least one first pixel region of the first image in response to the interaction operation acting on the first image, each first pixel region including an object; determining, from the at least one first pixel region, a first target region on which the interaction operation acts; and determining an object in the first target region as the first object.

In an embodiment, the at least one piece of program code is loaded and executed by the processor to implement the following steps: determining at least one second pixel region of the second image based on a pixel in the at least one first pixel region and an adjusted display position of the pixel, a second pixel region being corresponding to a first pixel region, and an original display position of a pixel in the second pixel region being in the corresponding first pixel region; determining, in response to an interaction operation acting on the second image, a second target region on which the interaction operation acts from the at least one second pixel region; and determining an object in the second target region as a second object, and playing audio data corresponding to the second object.

In an embodiment, the at least one piece of program code is loaded and executed by the processor to implement the following steps: obtaining a playing volume corresponding to an action force of the interaction operation; and playing the audio data corresponding to the first object based on the playing volume.

In an embodiment, the at least one piece of program code is loaded and executed by the processor to implement the following steps: determining a subject object in the video; extracting audio data of the subject object from a video clip in which the subject object exists in the video; and generating a correspondence between the subject object and the audio data of the subject object.

In an exemplary embodiment, a computer-readable storage medium is further provided, storing at least one piece of program code, the at least one piece of program code being executable by a processor of a computer device to implement the following steps: obtaining, in response to an interaction operation acting on a first image, an adjustment parameter corresponding to the interaction operation, the adjustment parameter indicating an adjustment range of a display position of a pixel in the first image based on the interaction operation, and the first image being an image currently displayed in a video being played; obtaining a displacement parameter of the pixel of the first image, the displacement parameter representing a displacement of the pixel between the first image and a second image, and the second image being an image displayed after the first image; adjusting the display position of the pixel in the first image based on the adjustment parameter and the displacement parameter; and displaying the second image based on the adjusted display position of the pixel.

In an embodiment, the at least one piece of program code may be executed by a processor of a computer device to implement the following steps: obtaining an action force of the interaction operation in response to the interaction operation acting on the first image; and determining, based on the action force of the interaction operation, the adjustment parameter matching the action force.

In an embodiment, the at least one piece of program code may be executed by a processor of a computer device to implement the following steps: determining the adjustment parameter based on a reference action force, a reference adjustment parameter corresponding to the reference action force, and the action force of the interaction operation, the adjustment parameter being positively correlated with the reference adjustment parameter, the adjustment parameter being negatively correlated with the reference action force, and the adjustment parameter being positively correlated with the action force of the interaction operation.

In an embodiment, the at least one piece of program code may be executed by a processor of a computer device to implement the following steps: inputting the first image into an optical flow estimation model to obtain the displacement parameter of the pixel of the first image; and decoding encoded data of the video, to obtain the displacement parameter of the pixel of the first image, the encoded data including the displacement parameter encoded.

In an embodiment, the at least one piece of program code may be executed by a processor of a computer device to implement the following steps: adjusting, based on the adjustment parameter and the displacement parameter, the display position of the pixel on which the interaction operation acts in the first image.

In an embodiment, the at least one piece of program code may be executed by a processor of a computer device to implement the following steps: determining a target offset parameter based on the adjustment parameter and the displacement parameter; and adjusting, based on an offset distance and an offset direction indicated by the target offset parameter, the display position of the pixel on which the interaction operation acts in the first image.

In an embodiment, the at least one piece of program code may be executed by a processor of a computer device to implement the following steps: obtaining a weight corresponding to the interaction operation, the weight representing a degree of influence of the interaction operation on an offset of the display position of the pixel; and weighting the adjustment parameter based on the weight, and adjusting the display position of the pixel in the first image based on the weighted adjustment parameter and the displacement parameter.

In an embodiment, the at least one piece of program code may be executed by a processor of a computer device to implement the following steps: determining, in response to the interaction operation acting on the first image, a first object on which the interaction operation acts in the first image; obtaining audio data corresponding to the first object from a correspondence between an object and audio data; and playing the audio data corresponding to the first object.

In an embodiment, the at least one piece of program code may be executed by a processor of a computer device to implement the following steps: determining at least one first pixel region of the first image in response to the interaction operation acting on the first image, each first pixel region including an object; determining, from the at least one first pixel region, a first target region on which the interaction operation acts; and determining an object in the first target region as the first object.

In an embodiment, the at least one piece of program code may be executed by a processor of a computer device to implement the following steps: determining at least one second pixel region of the second image based on a pixel in the at least one first pixel region and an adjusted display position of the pixel, a second pixel region being corresponding to a first pixel region, and an original display position of a pixel in the second pixel region being in the corresponding first pixel region; determining, in response to an interaction operation acting on the second image, a second target region on which the interaction operation acts from the at least one second pixel region; and determining an object in the second target region as a second object, and playing audio data corresponding to the second object.

In an embodiment, the at least one piece of program code may be executed by a processor of a computer device to implement the following steps: obtaining a playing volume corresponding to an action force of the interaction operation; and playing the audio data corresponding to the first object based on the playing volume.

In an embodiment, the at least one piece of program code may be executed by a processor of a computer device to implement the following steps: determining a subject object in the video; extracting audio data of the subject object from a video clip in which the subject object exists in the video; and generating a correspondence between the subject object and the audio data of the subject object.

For example, the computer-readable storage medium may be a read-only memory (ROM), a random access memory (RAM), a compact disc read-only memory (CD-ROM), a magnetic tape, a floppy disk, an optical data storage device, or the like.

This disclosure also provides a computer program product or computer program, including computer program code, the computer program code being stored in a computer-readable storage medium, a processor of a computer device reading the computer program code from the computer-readable storage medium, and the processor executing the computer program code, to cause the computer device to perform the video processing method in the foregoing method embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A video processing method, comprising:
obtaining, in response to an interaction operation received on an object in a first image, an adjustment parameter having a direction corresponding to the interaction operation, the adjustment parameter indicating an adjustment range of a display position of one or more pixels representing the object in the first image based on the interaction operation, and the first image being an image of the object currently displayed in a video being played;

obtaining a weight corresponding to the interaction operation, the weight representing a degree of influence of the interaction operation;

obtaining a weighted adjustment parameter by applying the weight to the adjustment parameter;

obtaining a displacement parameter representing an offset of the one or more pixels of the object between the first image and a second image which is displayed after the first image in the video;

adjusting a display position of one or more pixels of the object in the second image by combining the display position of one or more pixels of the object in the first image, the weighted adjustment parameter, and the displacement parameter;

obtaining audio data corresponding to the object in the first image from stored correspondences between objects and audio data; and displaying the second image based on the adjusted display position of the one or more pixels and playing the obtained audio data corresponding to the object.

2. The method according to claim 1, wherein the obtaining the adjustment parameter comprises:

obtaining an action force of the interaction operation in response to receiving the interaction operation acting on the first image; and determining, based on the action force of the interaction operation, the adjustment parameter matching the action force.

3. The method according to claim 2, wherein the determining comprises:

determining the adjustment parameter based on a reference action force and the action force of the interaction operation, a reference adjustment parameter corresponding to the reference action force, the adjustment parameter being positively correlated with the action force of the interaction operation.

4. The method according to claim 1, wherein the obtaining the displacement parameter comprises any one of:

inputting the first image into an optical flow estimation model to obtain the displacement parameter of the one or more pixels of the object in the first image; and decoding encoded data of the video, to obtain the displacement parameter of the one or more pixels of the object in the first image, the encoded data comprising the displacement parameter.

5. The method according to claim 1, wherein the one or more pixels of the object in the second image corresponds to the object in the first image on which the interaction operation was received.

6. The method according to claim 5, wherein the adjusting further comprises:

determining an offset parameter based on the weighted adjustment parameter and the displacement parameter; and adjusting, based on an offset distance and an offset direction indicated by the offset parameter, the display position of the one or more pixels of the object in the second image.

7. The method according to claim 1, further comprising:

determining one or more first pixel regions of the first image, each first pixel region comprising a corresponding object;

determining, from among the one or more first pixel regions, a first target region on which the interaction operation is received; and determining a corresponding object in the first target region as the object in the first image on which the interaction operation was received.

8. The method according to claim 7, further comprising:

determining one or more second pixel regions of the second image based on adjusted display positions of the one or more first pixel regions, a second pixel region corresponding to a respective first pixel region;

determining, in response to an interaction operation received on the second image, a second target region on which the interaction operation was received from among the one or more second pixel regions; and determining a corresponding object in the second target region as a second object, and playing audio data corresponding to the second object.

9. The method according to claim 1, wherein the playing comprises:

obtaining a playing volume corresponding to an action force of the interaction operation; and playing the obtained audio data corresponding to the object in the first image based on the playing volume.

10. The method according to claim 1, further comprising:

determining a main object in the video;

extracting audio data of the main object from a portion of the video in which the main object is shown; and storing a correspondence between the main object and the extracted audio data of the main object.

11. A video processing apparatus, comprising:

processing circuitry configured to:

obtain, in response to an interaction operation received on an object in a first image, an adjustment parameter having a direction corresponding to the interaction operation, the adjustment parameter indicating an adjustment range of a display position of one or more pixels representing the object in the first image based on the interaction operation, and the first image being an image of the object currently displayed in a video being played;

obtain a weight corresponding to the interaction operation, the weight representing a degree of influence of the interaction operation;

obtain a weighted adjustment parameter by applying the weight to the adjustment parameter;

obtain a displacement parameter representing an offset of the one or more pixels of the object between the first image and a second image which is displayed after the first image in the video;

adjust a display position of one or more pixels of the object in the second image by combining the display position of one or more pixels of the object in the first image, the weighted adjustment parameter, and the displacement parameter;

obtain audio data corresponding to the object in the first image from stored correspondences between objects and audio data; and display the second image based on the adjusted display position of the one or more pixels and play the obtained audio data corresponding to the object.

12. The apparatus according to claim 11, wherein the processing circuitry is further configured to:

obtain an action force of the interaction operation in response to receiving the interaction operation acting on the first image; and determine, based on the action force of the interaction operation, the adjustment parameter matching the action force.

13. The apparatus according to claim 12, wherein the processing circuitry is further configured to:
determine the adjustment parameter based on a reference action force and the action force of the interaction operation, a reference adjustment parameter corresponding to the reference action force,
the adjustment parameter being positively correlated with the action force of the interaction operation.

14. The apparatus according to claim 11, wherein the processing circuitry is further configured to perform any one of:
input the first image into an optical flow estimation model to obtain the displacement parameter of the one or more pixels of the object in the first image; and
decode encoded data of the video to obtain the displacement parameter of the one or more pixels of the object in the first image, the encoded data comprising the displacement parameter.

15. The apparatus according to claim 11, wherein the one or more pixels of the object in the second image correspond to the object in the first image on which the interaction operation was received.

16. The apparatus according to claim 15, wherein the processing circuitry is further configured to:
determine an offset parameter based on the weighted adjustment parameter and the displacement parameter; and
adjust, based on an offset distance and an offset direction indicated by the offset parameter, the display position of the one or more pixels of the object in the second image.

17. A non-transitory computer-readable storage medium, storing instructions which when executed by a processor cause the processor to perform:
obtaining, in response to an interaction operation received on an object in a first image, an adjustment parameter having a direction corresponding to the interaction operation, the adjustment parameter indicating an adjustment range of a display position of one or more pixels representing the object in the first image based on the interaction operation, and the first image being an image of the object currently displayed in a video being played;
obtaining a weight corresponding to the interaction operation, the weight representing a degree of influence of the interaction operation;
obtaining a weighted adjustment parameter by applying the weight to the adjustment parameter;
obtaining a displacement parameter representing an offset of the one or more pixels of the object between the first image and a second image which is displayed after the first image in the video;
adjusting a display position of one or more pixels of the object in the second image by combining the display position of one or more pixels of the object in the first image, the weighted adjustment parameter, and the displacement parameter;
obtaining audio data corresponding to the object in the first image from stored correspondences between objects and audio data; and
displaying the second image based on the adjusted display position of the one or more pixels and playing the obtained audio data corresponding to the object.

18. The non-transitory computer-readable storage medium according to claim 17, wherein the instructions when executed by the processor further cause the processor to perform:
obtaining an action force of the interaction operation in response to receiving the interaction operation acting on the first image; and
determining, based on the action force of the interaction operation, the adjustment parameter matching the action force.

19. The non-transitory computer-readable storage medium according to claim 18, wherein the instructions when executed by the processor further cause the processor to perform:
determining the adjustment parameter based on a reference action force and the action force of the interaction operation, a reference adjustment parameter corresponding to the reference action force,
the adjustment parameter being positively correlated with the action force of the interaction operation.

\* \* \* \* \*